(No Model.)
O. A. KELSEY.
SHEATHING LATH MACHINE.
No. 372,073. Patented Oct. 25, 1887.
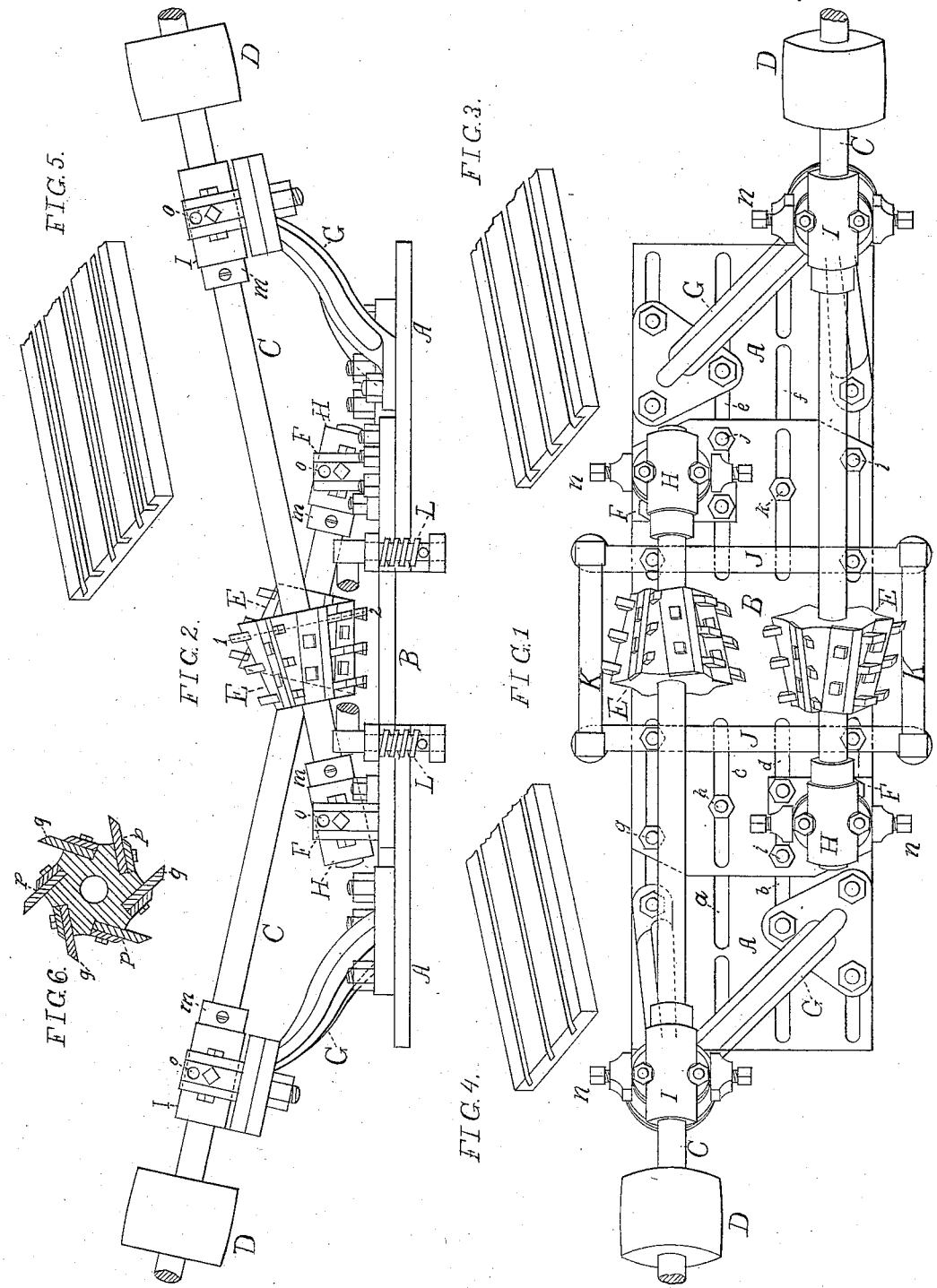

UNITED STATES PATENT OFFICE.

OLIVER AUSTIN KELSEY, OF BATTLE CREEK, MICHIGAN, ASSIGNOR TO WILLIAM SAMUEL LEONARD, OF SAME PLACE.

SHEATHING-LATH MACHINE.

SPECIFICATION forming part of Letters Patent No. 372,073, dated October 25, 1887.

Application filed September 6, 1886. Serial No. 212,789. (No model.)

*To all whom it may concern:*

Be it known that I, OLIVER AUSTIN KELSEY, a citizen of the United States, residing at Battle Creek, in the county of Calhoun and State of Michigan, have invented a new and useful Sheathing-Lath Machine, of which the following is a specification.

My invention relates to improvements in machines for grooving lumber-boards in such a manner that the said boards may with advantage be used as a combination of sheathing and laths; and the objects of my improvements are to provide a machine that can be attached and readily adjusted to any size or style of wood-planer and to cut any thickness of lumber. I attain these objects by the mechanism illustrated in the accompanying drawings, in which—

Figure 1 is a top view of the entire machine; Fig. 2, an end elevation thereof, or such a view as may be had by looking at the machine from the rear end of the planer to which it may be attached; and Fig. 6, a section of one of the cutter-heads on the line 1 2, Fig. 2. Figs. 3, 4, and 5 show three of the varieties of work the machine is adapted to perform.

Similar letters refer to similar parts throughout the several views.

A B A constitute the bed-plate of the machine; C C, two shafts inclined at an angle to the bed-plate; D D, two pulleys by which the machine is driven; E E, the two cutter-heads; F F and G G, brackets in which the shaft-bearings H H and I I are pivoted; J J, flat guide-bars which keep the lumber in proper position; K K, rollers which resist the tendency of the lumber to lift and at the same time facilitate its easy exit from the machine; L L, springs which are so connected to the rollers K K as to prevent the rollers from holding the lumber down too rigidly.

The bed-plate A B A is made in three pieces to admit of adjustment to planers of various widths. To further facilitate adjustment, these pieces are provided with oblong slots *a b c d e f*, &c., and are fastened together with bolts, as shown. (See Fig. 1.) When the machine is to be attached to a planer, the bolts *g h i j k l*, &c., are slacked, and the end pieces, A A, of the bed-plate are drawn apart or together, as the case may require, and in the slots in the outer ends of the said pieces A A suitable bolts or screws are inserted, by means of which the machine is fastened to the planer.

The shafts C C are respectively of uniform diameter throughout their lengths, the lateral movement of the shafts being prevented by the collars *m m m m*, which may be tightened anywhere along the shafts, and the brackets F F and G G, carrying the pivoted shaft-bearings H H and I I, may be fastened in any required position on the bed-plate by means of bolts through the oblong slots with which the bed-plate is provided. These features facilitate the adjustment of the cutter-heads E E to different thicknesses of lumber and shapes of grooves. For instance, if it is desired to lower the cutter-heads for thinner lumber, the brackets F F are moved nearer their respective cutter-heads, while the brackets G G are moved farther from the same. The adjustable collars *m m m m* are then slacked, and the shafts, with the cutter-heads, are slid in their bearings to bring the cutter-heads in proper position over the lumber; or the cutter-heads may be moved on the shafts to the required position, instead of moving shafts and cutter-heads together. When it is desired to cut dovetailed grooves, as shown in Fig. 3, the cutter-heads E E are retained in about the position shown in the drawings. To cut grooves similar to those seen in Fig. 5, the cutter-heads may be moved far enough to the right and left of their respective positions to produce the desired result. If grooves like those shown in Fig. 4 are required, one of the shafts C C may be moved with its cutter-head from the machine, or the cutter-head may be slid up the incline of the shaft enough to clear the lumber to be grooved. For adjustment on the shafts the cutter-heads may be provided with set-screws or keys, as may be preferred. By attaching to the cutter-heads cutters of different shape grooves of other shapes than those shown in Figs. 3, 4, and 5 may be cut.

My machine affords other facilities than those described for raising the cutter-heads. The set-screws *n n n n*, &c., (see Fig. 1,) which are pointed to fit in countersunk projections on the shaft-bearings H H and I I, may be inserted in the threaded holes o o o o, &c., (see Fig. 2,) and the shaft raised a corresponding height, or the shafts may be raised by placing strips of hard wood under the feet of the brackets.

The cutter-heads E E, which are tapering in diameter, as shown in Figs. 1 and 2, are provided with transverse grooves or slots to receive the cutters, and the latter are held fast by screws in connection with the binders p p p, &c., as shown in Fig. 6. This arrangement admits of the cutters q q q, &c., being sharpened and replaced independently of each other and with ease. It also allows them to be moved outward to compensate for wear.

The sectional view, Fig. 6, shows a cutter-head of six rows of cutters, and Figs. 1 and 2 show that each row contains three cutters, thus making eighteen cutters to each cutter-head. I do not, however, desire to confine myself to this particular form of cutter-head or to any particular number of cutters. The cutter-heads may be constructed so as to receive more or less than six rows of cutters, and each row may contain more or less than three cutters. For instance, a cutter-head may be made with two rows of cutters, each row being opposite the other at or near the periphery of the cutter-head, and the cutters may be fastened by set-screws screwed in the ends of the cutter-head, so that the points of the screws press on the sides of the cutters and so hold them fast; nor do I wish to confine myself to the particular form of bed-plate shown. The bed-plate may be made in less than three pieces, and, if desired, it may be made in one piece with oblong slots.

The machine is designed to be attached to the rear end of any wood-planer, and may be driven from any convenient revolving shaft on the planer to which it is attached, or the counter-shaft thereof.

I am aware that previous to my invention sheathing-lath machines have been made with inclined shafts carrying circular saws. I therefore do not claim to have originated that position for the shafts; but What I do claim as my invention, and desire to secure by Letters Patent, is—

In a sheathing-lath machine, the combination of a slotted bed-plate, brackets F F and G G, laterally adjustable on said bed-plate and carrying suitable shaft-bearings, oppositely-inclined arbors in said bearings, tapering cutter-heads having adjustable cutters secured thereto, said cutter-heads being secured to the oppositely-inclined arbors, which arbors are laterally adjustable by movable collars and have suitable pulleys by which they are driven, the rollers K K, and suitable guide-bars to guide the lumber while the same is passing through the machine, all substantially as specified, and for the purpose set forth.

OLIVER AUSTIN KELSEY.

Witnesses:
JOSEPHINE W. CLAPP,
FRANK W. CLAPP.